United States Patent
Drader et al.

(10) Patent No.: US 8,014,821 B2
(45) Date of Patent: Sep. 6, 2011

(54) MOBILE WIRELESS COMMUNICATIONS DEVICE INCLUDING SHARED VOICE COIL TO PROVIDE HEARING AID COMPATIBILITY AND RELATED METHODS

(75) Inventors: Marc Drader, Waterloo (CA); Qian Wang, Kitchener (CA); Larry Hawker, Waterloo (CA)

(73) Assignee: Research In Motion Limited, Waterloo, Ontario (CA)

( * ) Notice: Subject to any disclaimer, the term of this patent is extended or adjusted under 35 U.S.C. 154(b) by 505 days.

(21) Appl. No.: 12/190,722

(22) Filed: Aug. 13, 2008

(65) Prior Publication Data

US 2009/0186653 A1    Jul. 23, 2009

Related U.S. Application Data

(60) Provisional application No. 61/022,023, filed on Jan. 18, 2008.

(51) Int. Cl.
*H04M 1/00* (2006.01)
(52) U.S. Cl. .......... 455/556.1; 455/550.1; 455/575.1
(58) Field of Classification Search .......... 455/41.2, 455/41.1, 550.1, 556.1, 575.1; 381/312, 381/317
See application file for complete search history.

(56) References Cited

U.S. PATENT DOCUMENTS

| | | | | |
|---|---|---|---|---|
| 6,009,311 | A * | 12/1999 | Killion et al. | 455/63.1 |
| 6,078,675 | A | 6/2000 | Bowen-Nielsen et al. | 381/331 |
| 6,904,298 | B2 | 6/2005 | Arai et al. | 455/556 |
| 7,343,181 | B2 * | 3/2008 | Chan et al. | 455/575.3 |
| 7,426,279 | B2 * | 9/2008 | Cochran et al. | 381/331 |
| 7,561,711 | B2 * | 7/2009 | Hawker et al. | 381/331 |
| 7,693,411 | B2 * | 4/2010 | Kwon et al. | 396/127 |
| 2003/0003864 | A1 | 1/2003 | Locke | 455/41 |
| 2004/0240692 | A1 | 12/2004 | Julstrom | 381/315 |
| 2005/0244022 | A1 | 11/2005 | Muthuswamy et al. | 381/315 |
| 2006/0126873 | A1 | 6/2006 | Lee | 381/312 |
| 2006/0133633 | A1 | 6/2006 | Hyvonen et al. | 455/550 |
| 2007/0064963 | A1 | 3/2007 | Hawker et al. | 381/315 |

FOREIGN PATENT DOCUMENTS

JP    2007325042    12/2007

OTHER PUBLICATIONS

Hearing Aid Compatibility Technical Bulletin, available at www.sandman.com, 2007.
Hearing Aid-Compatibility for Telephone Equipment, FCC Consumer Facts, Dec. 11, 2006.

* cited by examiner

*Primary Examiner* — Sonny Trinh
(74) *Attorney, Agent, or Firm* — Allen, Dyer, Doppelt, Milbrath & Gilchrist, P.A.

(57) ABSTRACT

A mobile wireless communications device is for use with a hearing aid including a hearing aid compatible (HAC) coil. The device may include a portable housing and a wireless receiver carried by the portable housing. The device may also include at least one image capture component and a positioning coil associated therewith and carried by the portable housing. A controller may also be carried by the portable housing for selectively operating the positioning coil for image capture, and for inductively coupling received signals from the wireless receiver to the HAC coil.

20 Claims, 4 Drawing Sheets

MOBILE WIRELESS COMMUNICATIONS DEVICE INCLUDING SHARED VOICE COIL TO PROVIDE HEARING AID COMPATIBILITY AND RELATED METHODS

RELATED APPLICATION

This application is based upon prior filed provisional application Ser. No. 61/022,023 filed Jan. 18, 2008, the entire subject matter of which is incorporated herein by reference in its entirety.

TECHNICAL FIELD

The present disclosure relates to the field of communications systems, and, more particularly, to mobile wireless communications devices and related methods.

BACKGROUND

Cellular communications systems continue to grow in popularity and have become an integral part of both personal and business communications. Cellular telephones allow users to place and receive voice calls most anywhere they travel. Moreover, as cellular telephone technology has increased, so too has the functionality of cellular devices and the different types of devices available to users. For example, many cellular devices now incorporate personal digital assistant (PDA) features such as calendars, address books, task lists, etc. Moreover, such multi-function devices may also allow users to wirelessly send and receive electronic mail (email) messages and access the Internet via a cellular network and/or a wireless local area network (WLAN), for example. Cameras have also been incorporated in cellular phones.

Even so, as the functionality of cellular communications devices continues to increase, so too does the demand for smaller devices which are easier and more convenient for users to carry. One challenge this poses for cellular device manufacturers is how to include all of the necessary components to provide desired functionality within a relatively small form factor.

In addition to meeting desired consumer demands, other constraints may also be placed on mobile device manufacturers that may require additional components to be included within a device. For example, in the U.S., pursuant to the Hearing Aid Compatibility (HAC) Act of 1988, the FCC requires cell phone makers to produce several models of devices that are designed to be compatible with hearing aids. FCC rules require that phones subject to the HAC Act: (1) produce a magnetic field of sufficient strength and quality to permit coupling with hearing aids that contain telecoils; and (2) provide an adequate range of volume. A telecoil is a small, tightly-wrapped piece of wire that, when activated, picks up the voice signal from the electromagnetic field generated by compatible telephones. Users of telecoil-equipped hearing aids are able to communicate effectively over the telephone without feedback and without the amplification of unwanted background noise.

A telephone that is hearing aid compatible often has a dedicated internal component, such as an HAC voice coil, that allows the use of telephone-compatible hearing aids. This dedicated HAC coil may be in addition to a receiver coil already present in the cellular phone. Yet, the inclusion of such an HAC coil in an already crowded space to meet the bandpass and other requirements of the HAC standard can pose significant challenges for cellular phone manufactures.

As such, new techniques may be desirable to provide compliance with applicable standards, such as HAC standards (e.g., ANSI C63.19), without requiring larger form factors on hand held devices that are undesirable to users.

One exemplary HAC compatible mobile phone system is set forth in U.S. Patent Pub. No. 2006/0126873 to Lee. This reference discloses an apparatus for generating a magnetic field in a portable wireless terminal for a hearing impaired person. In the apparatus, an amplifier amplifies a voice-band electric signal received from a CODEC to a predetermined level, and a coil converts the amplified electric signal into a corresponding magnetic signal. The coil is configured to generate the magnetic signal sufficiently enough to allow a hearing impaired user wearing a hearing aid to make and receive calls with the portable wireless terminal.

Despite the existence of such systems, it may be desirable to provide further functionality and space saving features in mobile wireless communications devices that are hearing aid compatible.

DETAILED DESCRIPTION

The present description is made with reference to the accompanying drawings, in which preferred embodiments are shown. However, many different embodiments may be used, and thus the description should not be construed as limited to the embodiments set forth herein. Rather, these embodiments are provided so that this disclosure will be thorough and complete. Like numbers refer to like elements throughout, and prime notation is used to indicate similar elements in alternate embodiments.

Generally speaking, the present disclosure is directed to a mobile wireless communications device for use with a hearing aid comprising a hearing aid compatible (HAC) coil, the mobile wireless communications device which may include a portable housing, a wireless receiver carried by the portable housing, and at least one image capture component and a positioning coil associated therewith and carried by the portable housing. The device may further include a controller carried by the portable housing for selectively operating the positioning coil for image capture, and for inductively coupling received signals from the wireless receiver to the HAC coil.

More particularly, the at least one image capture component may include a camera lens, and the positioning coil may be an autofocus voice coil. Furthermore, the device may also include a charge coupled device (CCD) cooperating with the controller for capturing an image received via the camera lens. The controller may further include a bias circuit for biasing the positioning coil between an image capture equilibrium position, and an HAC coil coupling equilibrium position different than the image capture equilibrium position.

The mobile wireless communications device may also include an audio speaker carried by the portable housing adjacent the positioning coil. Furthermore, the device may also include a printed circuit board (PCB) carried by the portable housing and carrying the audio output speaker and the positioning coil on a same side of the PCB. Additionally, the controller may selectively disable the audio output speaker.

The device may additionally include a wireless transmitter carried by the portable housing. By way of example, the wireless receiver and the wireless transmitter may be a cellular receiver and a cellular transmitter, respectively.

A related method for operating a mobile wireless communications device, such as the one described briefly above, may include selectively operating the positioning coil for image capture and for inductively coupling received signals from the wireless receiver to a hearing aid compatible (HAC) coil of a hearing aid.

Figure 1:
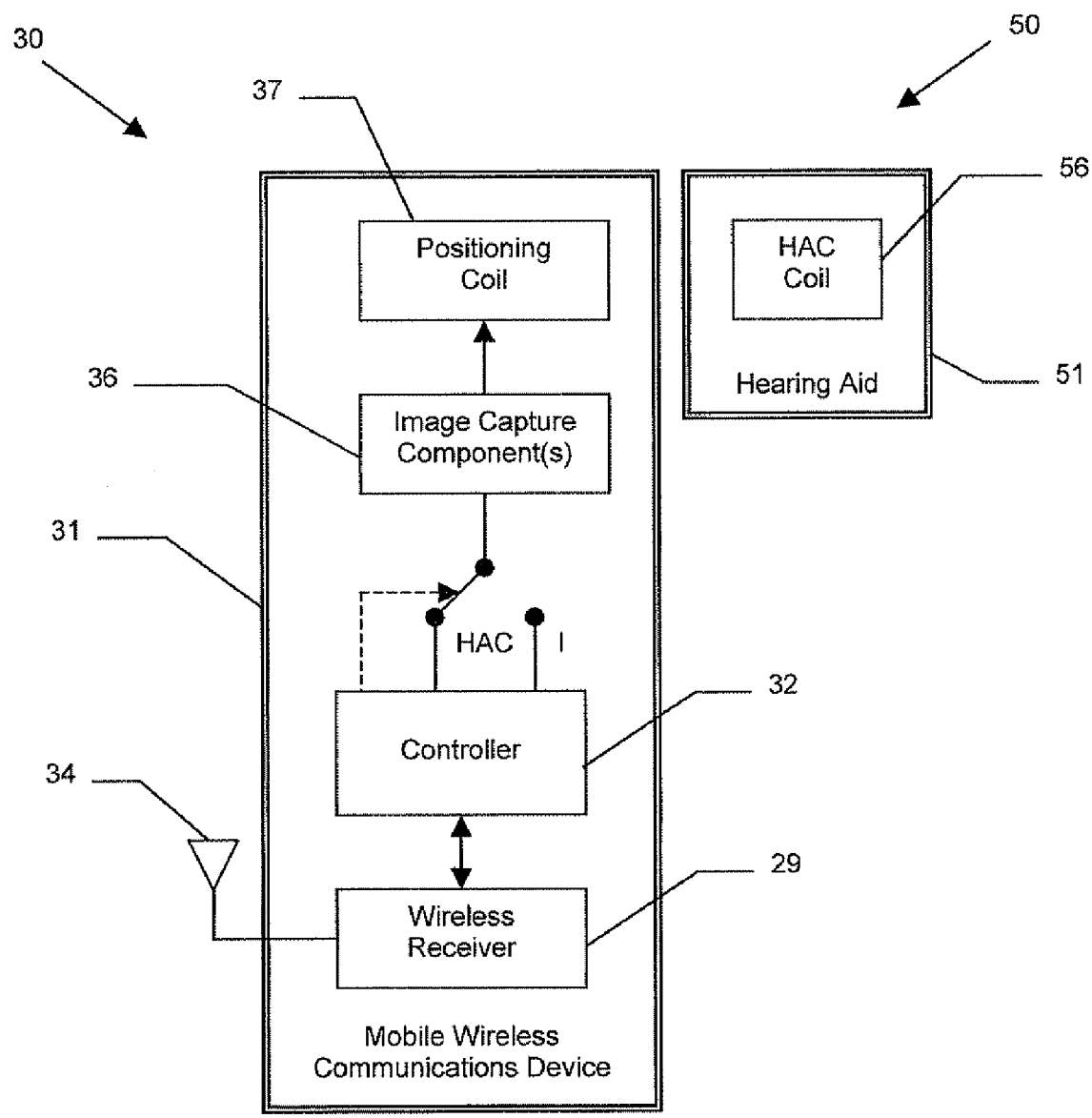
FIG. 1 is a schematic block diagram of an exemplary mobile wireless communications device including a shared voice coil to provide HAC compatibility to a hearing aid.

Referring initially to FIG. 1, a mobile wireless communications device 30 is for use with a hearing aid 50 including a housing 51 and a hearing aid compatible (HAC) coil 56 carried thereby. The device 30 illustratively includes a portable housing 31, and a wireless receiver 29 and associated antenna 34 carried by the portable housing. The device 30 also illustratively includes at least one image capture component 36 (e.g., camera lens, charge coupled device, etc.) and a positioning coil 37 (e.g., a voice coil) associated therewith and carried by the portable housing 31, as will be discussed further below. In addition, a controller 32 is also illustratively carried by the portable housing 31 for selectively operating the positioning coil 37 for image capture and for inductively coupling received signals from the wireless receiver 29 to the HAC coil 56.

Figure 2:
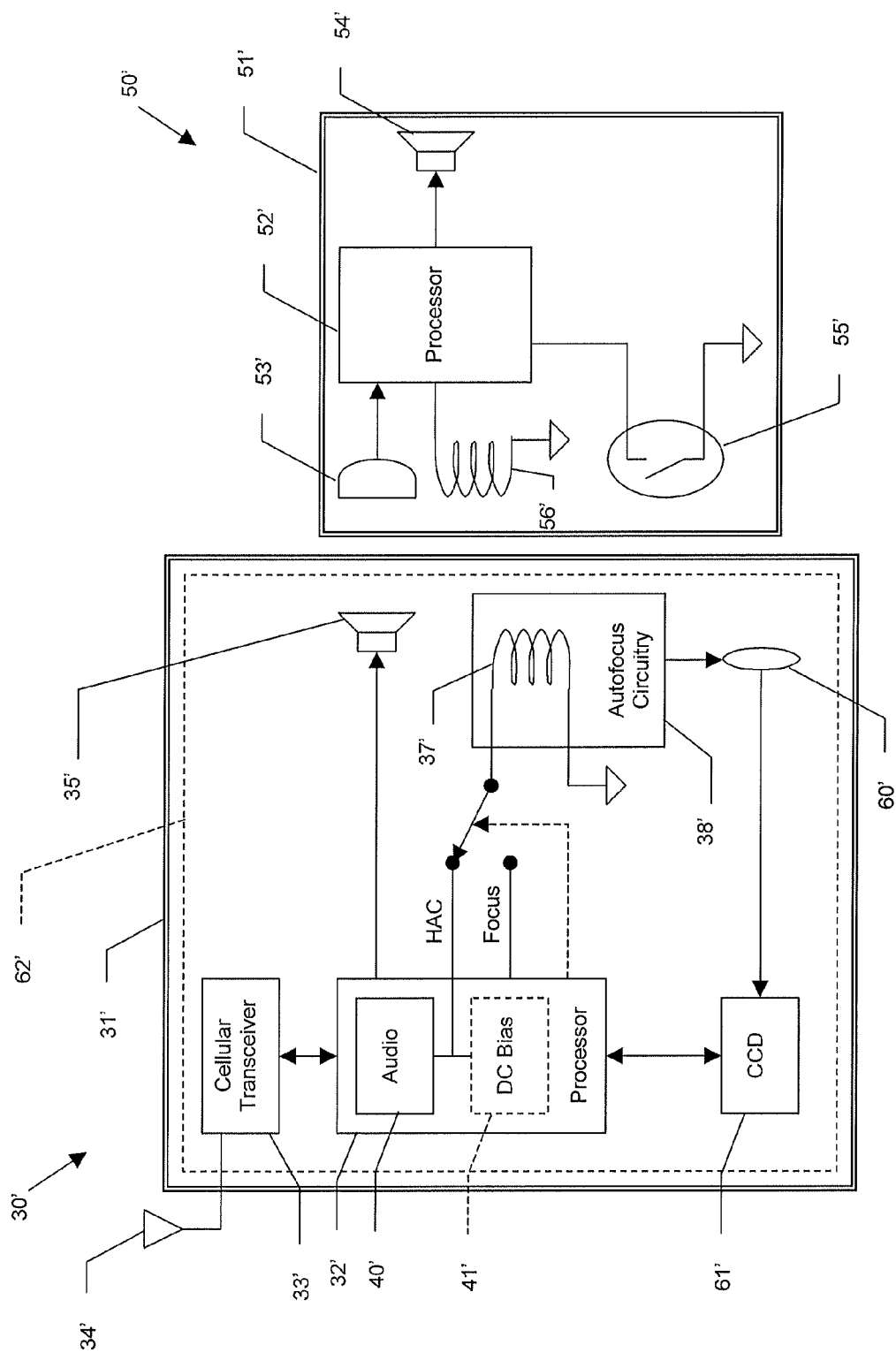
FIG. 2 is a schematic block diagram of an alternative embodiment of the mobile wireless communications device of FIG. 1.

Referring more particularly to FIG. 2, in accordance with an exemplary embodiment a mobile cellular device 30' illustratively includes the portable, handheld housing 31' and a controller implemented with a processor 32'. As used herein, "processor" in meant to include hardware (e.g., microprocessor, memory, etc.) and/or software components used to implement the noted functions, as will also be appreciated by those skilled in the art. Furthermore, a wireless transceiver (e.g., cellular transceiver) 33' and associated antenna(s) 34' (e.g., external antenna internal conductive trace antenna, etc.) is also carried by the housing 31'. The transceiver 33' is controlled by an audio module 40' of the processor 32', and received audio signals are output by an output transducer, such as the illustrated speaker 35', as will be appreciated by those skilled in the art. It will be appreciated, however, that wireless formats other than cellular (e.g., Bluetooth and/or 802.11 wireless LAN, etc.) may also be used.

The wireless communications device 30' also advantageously includes a camera including a camera lens 60' and associated autofocus actuator circuitry 38' for the autofocus a voice coil 37'. The actuator circuitry 38' is illustratively controlled by an output (Focus) from the processor 32'. A charge-coupled device (CCD) 61' or other image sensing device cooperates with the processor 32' for capturing and digitizing the analog input received through the camera lens 60', as will also be appreciated by those skilled in the art.

In the illustrated embodiment, a hearing aid 50' is used with the cellular device 30' and includes a housing 51', a hearing aid processor 52' carried by the housing, and an input transducer such as a microphone 53' connected to the hearing aid processor. During normal operation (i.e., when not used with a phone), audio input received by the microphone 53' is processed and output by the hearing aid processor 52' to an output transducer, such as a speaker 54', for a hearing aid user's ear, as will be appreciated by those skilled in the art. The hearing aid 50' also illustratively includes a magnetic switch 55' (e.g., a reed switch) and a telecoil 56' to provide HAC operating capabilities. More particularly, the switch 55' is actuated upon being placed in close proximity to a magnetic field generated by an HAC compliant wireless device, which causes the hearing aid processor 52' to switch from the microphone 53' to the telecoil 56' as the input source, as noted above.

To advantageously conserve resources and space within the housing 31' of the cellular device 30', which is typically at a premium as discussed above, while still providing HAC compliance, the voice coil 37' of the autofocus circuitry 38' is advantageously used for both autofocus of the camera lens 60' and for providing the requisite magnetic output to achieve desired HAC bandpass performance. More particularly, by sharing the voice coil 37' of the autofocus circuitry 38' to also provide the requisite magnetic output during an HAC telephone call, the device 30' advantageously need not include yet another dedicated HAC coil, as is often required in prior art configurations. Accordingly, significant savings in space and potentially component cost may be achieved.

The voice coil-based autofocus circuitry 38' may advantageously be located in the vicinity of the output speaker 35', for example. The voice coil 38' may be accessed directly via an HAC output of the processor 32' when making an HAC phone call to boost the magnetic field coupling to the hearing aid. This typically will not affect the camera autofocus function, as the camera is generally not being used during a phone call when the device 30' is held up to the user's ear. If this proves to be an issue, the voice signal may be momentarily disabled when the camera is in use. For example, in some situations a user may move the camera away from his head to take a picture, but the other call participant might keep speaking, which could otherwise prevent the autofocus from working. Thus, momentarily disabling the voice coil may alleviate this problem. The disabling operation may be performed automatically by the processor 32' upon selection of the camera mode for image capture, and/or manually by the user through a user interface, keypad/button actuation, etc. Moreover, in some embodiments an AC voice signal may potentially be used on the autofocus feature since it uses a DC voltage signal, as will be appreciated by those skilled in the art.

Turning now to an exemplary implementation, tests were conducted on a camera autofocus voice coil module (AF VCM) and the following results were obtained. The electrical impedance was relatively flat at about 30 Ohms throughout the entire telephony audio frequency range of 300 to 3400 Hz, which was consistent with the specification for the voice coil DC resistance. There was no observed impedance peak due to a mechanical resonance as is the case with a typical speaker, even though the VCM specification indicated it was an underdamped system with a resonance of around 85 Hz. The impedance rose at higher frequencies due to the coil inductance (just like any other speaker) and agreed reasonably well with the ratio of DC resistance to inductance. The tests also demonstrated that the magnetic frequency response was relatively flat (as suggested by the impedance curve), which fits the HAC mask (i.e., ANSI C63.19) to thereby provide desired HAC compliance in typical configurations.

In some embodiments of the above configuration, it may be possible to have undesirable audible sounds or clicking, especially at lower frequencies. Applicants speculate, without wishing to be bound thereto, that this may be due to the lens 60' equilibrium position (i.e., an image capture equilibrium position) being at one end, and so the AC voltage signal might force the coil 37' against a stop. This may be less of an issue at higher frequencies (e.g., above resonance) where the motion of a voice coil drops off at about 12 dB (displacement) per octave. In this regard, the processor 32' may include a DC bias module 41' so that the coil 37' may be driven with an AC signal while simultaneously applying a DC voltage to move the lens 60' to a new equilibrium position (i.e., an HAC coil coupling equilibrium position) to control the lens position and thereby reduce the clicking noise. Different polarities may be more useful in this regard than others, as will be appreciated by those skilled in the art.

Thus, the device 30' may advantageously utilize such a DC offset voltage to reduce possible undesired audible noise, as well as to protect the coil 37' from damage due to "slamming" it against the stop. In some embodiments, it may be possible to use a VCM with a different equilibrium position, e.g., in the middle away from the stop. This DC voltage could also potentially move the voice coil to a different equilibrium position closer to the user, thereby increasing the magnetic field, depending on the orientation of the voice coil as well as which end provides the equilibrium position.

In some embodiments there may be a distance penalty if the voice coil 37' is located on an opposite side of a device printed circuit board (PCB) 62' from the speaker 35'. As such, it may generally be desirable to keep the voice coil 37' as close to the speaker 35' as possible and on a same side of the PCB 62', although this may not be necessary in all embodiments depending upon the particular components used, the configuration, and the applicable targeted specifications. Depending on the given embodiment, the voice coil 37' may be used by itself, if it is strong enough, or to enhance the magnetic field from the speaker 35'. That is, the voice coil 37' may be used alone or to enhance the speaker 35' magnetic signal to achieve desired HAC bandpass performance, as will be appreciated by those skilled in the art. One situation where it might be used alone is if there is no magnetic field generated by the speaker 35', for example, if a piezoelectric type speaker is used. Another situation could be when the user wishes to disable the speaker 35' so that there is no acoustic output, only magnetic, such as for enhanced privacy. That is, the processor 32' may selectively disable the speaker 35' based upon a user input such as through a user interface or keypad/button, for example, for enhanced privacy, etc.

Figure 3:
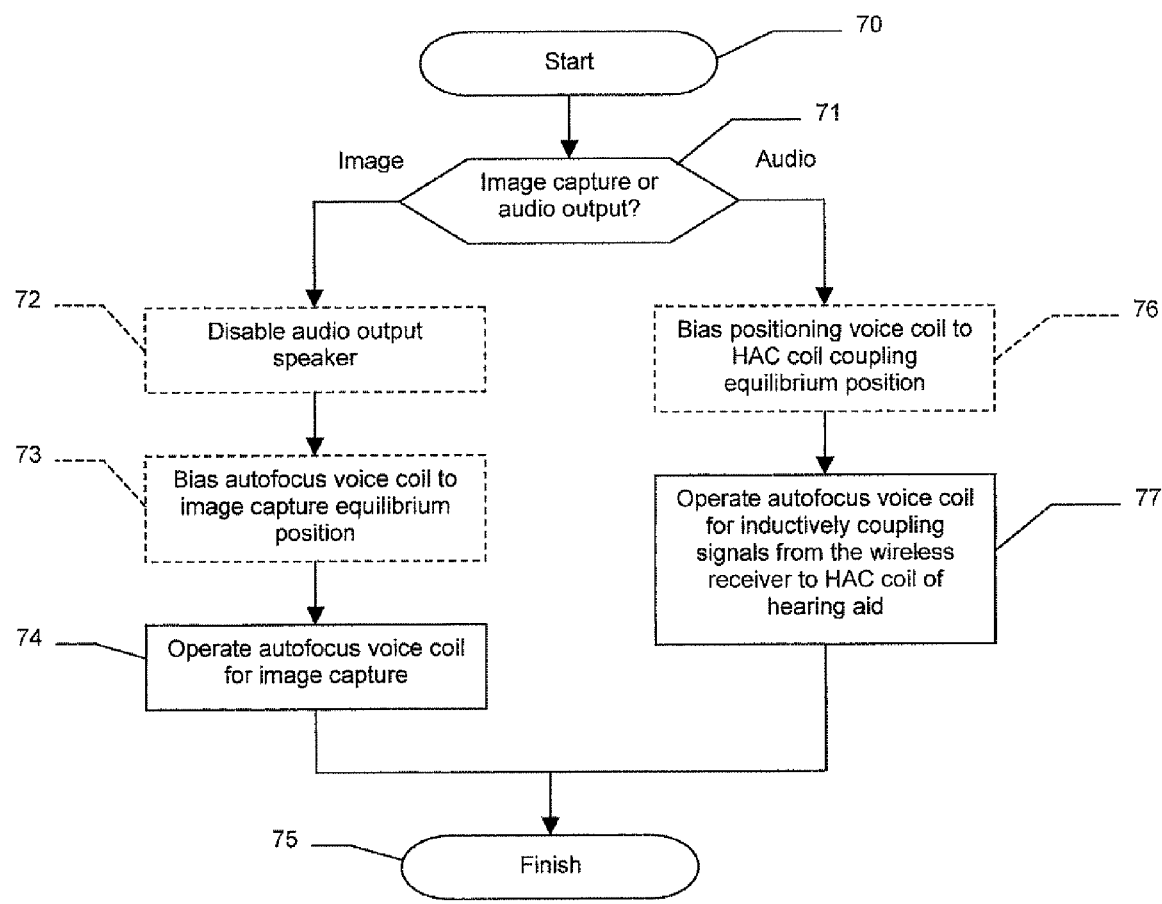
FIG. 3 is a flow diagram of a method of using a mobile wireless communications device in accordance with an exemplary embodiment.

A related method for operating a mobile wireless communications device, such as the cellular device 30' set forth above, is now described with reference to FIG. 3. The method illustratively begins (Block 70) with a determination as to how the voice coil 37' is to be used, i.e., for image capture (e.g., in a camera mode) or for inductively coupling received signals to the HAC telecoil 56' of the hearing aid 50' (i.e., in an audio mode), at Block 71. In the case of image capture (i.e., camera mode), the audio output speaker 35' may optionally be disabled and the voice coil 37' optionally biased to the image capture equilibrium position, at Blocks 72-73, as described above, so that the voice coil may advantageously be selectively operated for image capture, at Block 74, as described above, thus concluding the illustrated method (Block 75). Otherwise, if the voice coil 37' is to be used for audio output, it may optionally be biased to the HAC coil coupling equilibrium position, at Block 76, for inductively coupling received signals from the cellular transceiver 33' to the HAC telecoil 56' (Block 77), as also discussed above. It should be noted that in the same embodiments the voice coil 37' may revert to the equilibrium positions (e.g., the image capture equilibrium position), so biasing would only be necessary when the other mode of operation is used, as will be appreciated by those skilled in the art.

Figure 4:
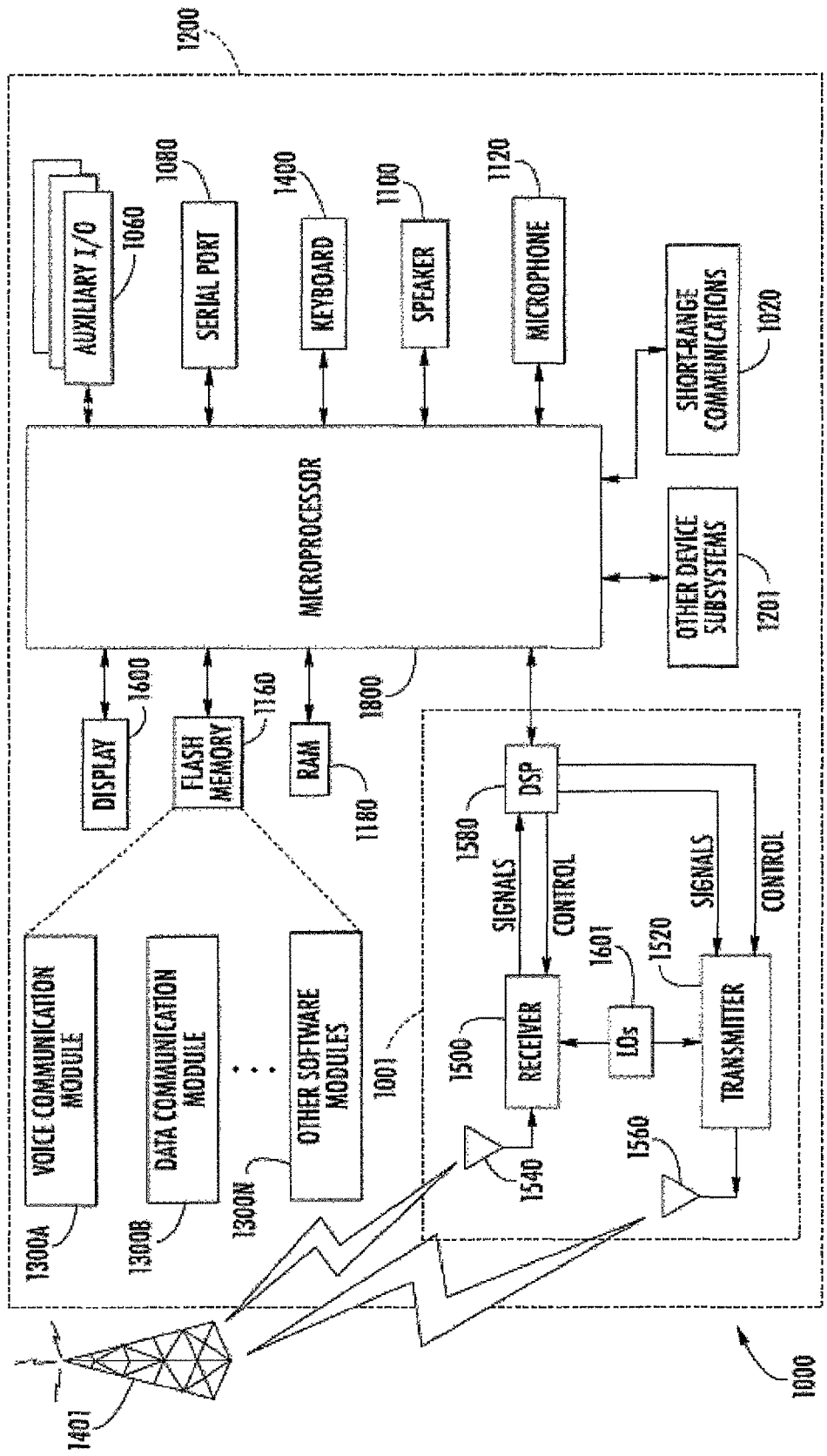
FIG. 4 is a schematic block diagram illustrating additional components which may be used in the mobile wireless communications device of FIG. 1 or 2.

Turning now to FIG. 4, exemplary components of a handheld mobile wireless communications device 1000 in which the above-described HAC compatible system may be used are further described. The device 1000 illustratively includes a housing 1200, a keypad 1400 and an output device 1600. The output device shown is a display 1600, which is preferably a full graphic LCD. Other types of output devices may alternatively be utilized. A processing device 1800 is contained within the housing 1200 and is coupled between the keypad 1400 and the display 1600. The processing device 1800 controls the operation of the display 1600, as well as the overall operation of the mobile device 1000, in response to actuation of keys on the keypad 1400 by the user. The housing 1200 may be elongated vertically, or may take on other sizes and shapes (including clamshell housing structures). The keypad may include a mode selection key, or other hardware or software for switching between text entry and telephony entry.

In addition to the processing device 1800, other parts of the mobile device 1000 are shown schematically in FIG. 4. These include a communications subsystem 1001; a short-range communications subsystem 1020; the keypad 1400 and the display 1600, along with other input/output devices 1060, 1080, 1100 and 1120; as well as memory devices 1160, 1180 and various other device subsystems 1201. The mobile device 1000 is preferably a two-way RF communications device having voice and data communications capabilities. In addition, the mobile device 1000 preferably has the capability to communicate with other computer systems via the Internet.

Operating system software executed by the processing device 1800 is preferably stored in a persistent store, such as the flash memory 1160, but may be stored in other types of memory devices, such as a read only memory (ROM) or similar storage element. In addition, system software, specific device applications, or parts thereof, may be temporarily loaded into a volatile store, such as the random access memory (RAM) 1180. Communications signals received by the mobile device may also be stored in the RAM 1180.

The processing device 1800, in addition to its operating system functions, enables execution of software applications 1300A-1300N on the device 1000. A predetermined set of applications that control basic device operations, such as data and voice communications 1300A and 1300B, may be installed on the device 1000 during manufacture. In addition, a personal information manager (PIM) application may be installed during manufacture. The PIM is preferably capable of organizing and managing data items, such as e-mail, calendar events, voice mails, appointments, and task items. The PIM application is also preferably capable of sending and receiving data items via a wireless network 1401. Preferably, the PIM data items are seamlessly integrated, synchronized and updated via the wireless network 1401 with the device user's corresponding data items stored or associated with a host computer system.

Communication functions, including data and voice communications, are performed through the communications subsystem 1001, and possibly through the short-range communications subsystem. The communications subsystem 1001 includes a receiver 1500, a transmitter 1520, and one or more antennas 1540 and 1560. In addition, the communications subsystem 1001 also includes a processing module, such as a digital signal processor (DSP) 1580, and local oscillators (LOs) 1601. The specific design and implementation of the communications subsystem 1001 is dependent upon the communications network in which the mobile device 1000 is intended to operate. For example, a mobile device 1000 may include a communications subsystem 1001 designed to operate with the Mobitex™, Data TAC™ or General Packet Radio Service (GPRS) mobile data communications networks, and also designed to operate with any of a variety of voice communications networks, such as AMPS, TDMA, CDMA, WCDMA, PCS, GSM, EDGE, etc. Other types of data and voice networks, both separate and integrated, may also be utilized with the mobile device 1000. The mobile device 1000 may also be compliant with other communications standards such as 3GSM, 3GPP, UMTS, etc.

Network access requirements vary depending upon the type of communication system. For example, in the Mobitex and DataTAC networks, mobile devices are registered on the network using a unique personal identification number or PIN associated with each device. In GPRS networks, however, network access is associated with a subscriber or user of a device. A GPRS device therefore requires a subscriber identity module, commonly referred to as a SIM card, in order to operate on a GPRS network.

When required network registration or activation procedures have been completed, the mobile device 1000 may send and receive communications signals over the communication network 1401. Signals received from the communications network 1401 by the antenna 1540 are routed to the receiver 1500, which provides for signal amplification, frequency down conversion, filtering, channel selection, etc., and may also provide analog to digital conversion. Analog-to-digital conversion of the received signal allows the DSP 1580 to perform more complex communications functions, such as demodulation and decoding. In a similar manner, signals to be transmitted to the network 1401 are processed (e.g. modulated and encoded) by the DSP 1580 and are then provided to the transmitter 1520 for digital to analog conversion, frequency up conversion, filtering, amplification and transmission to the communication network 1401 (or networks) via the antenna 1560.

In addition to processing communications signals, the DSP 1580 provides for control of the receiver 1500 and the transmitter 1520. For example, gains applied to communications signals in the receiver 1500 and transmitter 1520 may be adaptively controlled through automatic gain control algorithms implemented in the DSP 1580.

In a data communications mode, a received signal, such as a text message or web page download, is processed by the communications subsystem 1001 and is input to the processing device 1800. The received signal is then further processed by the processing device 1800 for an output to the display 1600, or alternatively to some other auxiliary I/O device 1060. A device user may also compose data items, such as e-mail messages, using the keypad 1400 and/or some other auxiliary I/O device 1060, such as a touchpad, a rocker switch, a thumb-wheel, or some other type of input device. The composed data items may then be transmitted over the communications network 1401 via the communications subsystem 1001.

In a voice communications mode, overall operation of the device is substantially similar to the data communications mode, except that received signals are output to a speaker 1100, and signals for transmission are generated by a microphone 1120. Alternative voice or audio I/O subsystems, such as a voice message recording subsystem, may also be implemented on the device 1000. In addition, the display 1600 may also be utilized in voice communications mode, for example to display the identity of a calling party, the duration of a voice call, or other voice call related information.

The short-range communications subsystem enables communication between the mobile device 1000 and other proximate systems or devices, which need not necessarily be similar devices. For example, the short-range communications subsystem may include an infrared device and associated circuits and components, or a Bluetooth™ communications module to provide for communication with similarly-enabled systems and devices.

Many modifications and other embodiments will come to the mind of one skilled in the art having the benefit of the teachings presented in the foregoing descriptions and the associated drawings. Therefore, it is understood that various modifications and embodiments are intended to be included within the scope of the appended claims.

That which is claimed is:

1. A mobile wireless communications device for use with a hearing aid comprising a hearing aid compatible (HAC) coil, the mobile wireless communications device comprising:
   a portable housing;
   a wireless receiver carried by said portable housing;
   at least one image capture component and a positioning coil associated therewith and carried by said portable housing; and
   a controller carried by said portable housing for selectively operating said positioning coil for image capture, and for inductively coupling received signals from said wireless receiver to the HAC coil.

2. The mobile wireless communications device of claim 1 wherein said at least one image capture component comprises a camera lens; and wherein said positioning coil comprises an autofocus voice coil.

3. The mobile wireless communications device of claim 2 further comprising a charge coupled device (CCD) cooperating with said controller for capturing an image received via said camera lens.

4. The mobile wireless communications device of claim 1 wherein said controller further comprises a bias circuit for biasing said positioning coil between an image capture equilibrium position, and an HAC coil coupling equilibrium position different than the image capture equilibrium position.

5. The mobile wireless communications device of claim 1 further comprising an audio speaker carried by said portable housing adjacent said positioning coil.

6. The mobile wireless communications device of claim 5 further comprising a printed circuit board (PCB) carried by said portable housing and carrying said audio output speaker and said positioning coil on a same side of said PCB.

7. The mobile wireless communications device of claim 5 wherein said controller selectively disables said audio output speaker.

8. The mobile wireless communications device of claim 1 further comprising a wireless transmitter carried by said portable housing.

9. The mobile wireless communications device of claim 8 wherein said wireless receiver and said wireless transmitter comprise a cellular receiver and a cellular transmitter, respectively.

10. A mobile wireless communications device for use with a hearing aid comprising a hearing aid compatible (HAC) coil, the mobile wireless communications device comprising:
    a portable housing;
    a wireless cellular receiver carried by said portable housing;
    a camera lens and an autofocus voice coil associated therewith and carried by said portable housing; and
    a controller carried by said portable housing for selectively operating said autofocus voice coil for image capture, and for inductively coupling received signals from said wireless cellular receiver to the HAC coil.

11. The mobile wireless communications device of claim 10 further comprising a charge coupled device (CCD) cooperating with said controller for capturing an image received via said camera lens.

12. The mobile wireless communications device of claim 10 wherein said controller further comprises a bias circuit for biasing said positioning coil between an image capture equilibrium position, and an HAC coil coupling equilibrium position different than the image capture equilibrium position.

13. The mobile wireless communications device of claim 10 further comprising an audio speaker carried by said portable housing adjacent said positioning coil.

14. The mobile wireless communications device of claim 13 further comprising a printed circuit board (PCB) carried by said portable housing and carrying said audio output speaker and said positioning coil on a same side of said PCB.

15. The mobile wireless communications device of claim 13 wherein said controller selectively disables said audio output speaker.

16. The mobile wireless communications device of claim 13 further comprising a wireless transmitter carried by said portable housing; and wherein said wireless receiver and said wireless transmitter comprise a cellular receiver and a cellular transmitter, respectively.

17. A method for operating a mobile wireless communications device comprising a wireless receiver and at least one image capture component and a positioning coil associated therewith, the method comprising:

selectively operating the positioning coil for image capture and for inductively coupling received signals from the wireless receiver to a hearing aid compatible (HAC) coil of a hearing aid.

18. The method of claim 17 wherein the at least one image capture component comprises a camera lens; and wherein the positioning coil comprises an autofocus voice coil.

19. The method of claim 17 further comprising biasing the positioning coil between an image capture equilibrium position, and an HAC coil coupling equilibrium position different than the image capture equilibrium position.

20. The method of claim 17 wherein the mobile wireless communications device further comprises an audio speaker; and further comprising selectively disabling the audio output speaker.

* * * * *